UNITED STATES PATENT OFFICE.

JAMES P. KIMBALL, OF BETHLEHEM, PENNSYLVANIA.

LINING FOR FURNACES, &c.

SPECIFICATION forming part of Letters Patent No. 227,542, dated May 11, 1880.

Application filed December 1, 1879.

*To all whom it may concern:*

Be it known that I, JAMES P. KIMBALL, of Bethlehem, State of Pennsylvania, have invented a new and Improved Lining for Furnaces or other chambered vessels in which molten iron is purified or converted into steel at high temperatures, of which the following is a specification.

One of the most important requisites in furnaces or vessels in which iron is purified, dephosphorized, or converted into steel at high temperatures with the aid of basic fluxes, like lime, magnesia, and oxides of iron, is a lining which shall be basic at the same time that it is refractory—basic, so as to resist chemical combination with the basic fluxes, and refractory, so as the more effectually to resist such chemical combinations under the action of elevated temperatures.

All basic linings hitherto proposed, such as beauxite bricks, or calcareo-magnesian bricks, or other bricks manufactured from plastic admixtures, are wanting in density and tenacity, and are not, therefore, sufficiently refractory. On the other hand, all refractory linings hitherto proposed, such as ganister, quartz-brick, fire-brick, &c., are not sufficiently basic. Acid linings of this class rapidly combine with basic fluxes, and, besides wasting and corroding, defeat the combination desired to be brought about between basic fluxes and the acid impurities of the molten bath. Thus it becomes impracticable to slag off the impurities of the charge by means of basic fluxes in the presence of an acid or silicious lining, which constantly gives way under this chemical action; hence the impracticability, by this means, of an economical or complete purification of the bath of metal.

The present difficulty to the effectual elimination of phosphorus from pig-iron in the several processes for its purification is overcome by a lining at once basic and refractory, so as to admit of the use of basic fluxes, like lime, magnesia, and oxide of iron. I have found that a particular mineral substance occurring in Westchester county, New York, and essentially consisting of a non-quartziferous admixture of titanic acid and magnetic oxide of iron, possesses all the desirable qualities above instanced—namely, refractoriness and a basic composition. Its heat-resisting properties, under the conditions of a basic reaction, are due to its density and particular state of aggregation, as well as to its absolute and relative composition, and especially to its freedom from quartz.

I take advantage of the essentially basic composition and the natural state of aggregation of the above-described material to apply it in its natural state to the lining of any furnace or vessel in which iron is purified by means of basic fluxes, like lime, magnesia, and oxide of iron, &c.

The mode of its application as a lining to furnaces and other vessels above specified is by roughly fitting pieces, lumps, or blocks of the material above described, of desirable size and shape, and by filling the interstices of the same with titaniferous magnetite, ilmenite, or common magnetic iron ore in a pulverized condition, with the addition of ten per cent. of graphite and not over one-third proportion of fire-clay. When practicable the lining thus prepared may be submitted to heat, with the object of binding or cementing the same; but this is not essential.

The object of the graphite is to reduce the magnetic oxide of iron, in part, to the metallic state.

I do not claim the application to furnace-linings of emery or other forms of alumina when pressed or molded into bricks, nor the mode of applying a lining to furnaces in natural pieces or lumps; but What I do claim as new, and desire to secure by Letters Patent, is—

The application to the lining of furnaces or other vessels in which basic fluxes or additions are used for the specific purpose of the purification of iron of a natural non-silicious mineral substance in its natural state, as above set forth, and essentially consisting of, first, not less than thirty-five per cent. of alumina; second, not less than two or more than five per cent. of titanic acid; third, not less than forty per cent. of magnetic oxide of iron; and, fourth, not more than three per cent. of silicic acid, bound and cemented in the manner above described.

J. P. KIMBALL.

In presence of—
  E. G. THOMPSON,
  BARON HIGHAM.